(No Model.)
O. M. DRAPER.
ORNAMENTAL CHAIN.
No. 353,543. Patented Nov. 30, 1886.
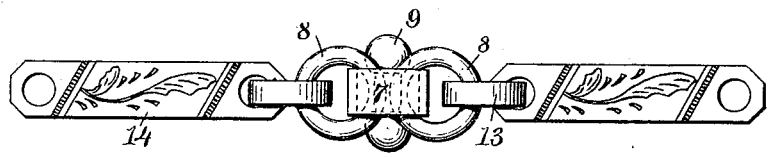
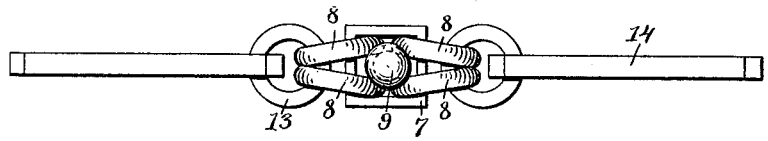
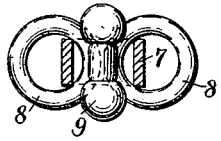
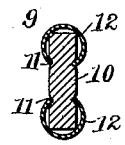
WITNESSES:
Willis Fowler,
Chas. H. Luther Jr
INVENTOR:
Oscar M. Draper
by Joseph A. Miller & Co
Attys

UNITED STATES PATENT OFFICE.

OSCAR M. DRAPER, OF NORTH ATTLEBOROUGH, MASSACHUSETTS.

ORNAMENTAL CHAIN.

SPECIFICATION forming part of Letters Patent No. 353,543, dated November 30, 1886.

Application filed July 17, 1886. Serial No. 208,255. (No model.)

*To all whom it may concern:*

Be it known that I, OSCAR M. DRAPER, of North Attleborough, in the county of Bristol and State of Massachusetts, have invented certain new and useful Improvements in Ornamental Chains, of which the following is a full, clear, and exact description, reference being had to the accompanying drawings, forming part of this specification.

My invention relates to an ornamental chain or the assemblage of interlocking chain-links strung out and maintained together. The objects of my invention are to provide a chain that is ornamental and durable, and that has a pleasing effect as an article of jewelry.

To the above purposes my invention consists of the association of the several links combined with a cross-bar, all as hereinafter fully described and claimed.

In the accompanying drawings illustrating my invention, Figure 1 represents a side view of a section of my novel chain connected up with two sections of an ordinary form of chain. Fig. 2 represents a top plan view of Fig. 1. Fig. 3 represents a side view of a section of my improved form of chain, the main or square link thereof being in section and the cross-bar completely exposed to view. Fig. 4 represents a longitudinal central sectional view of a cross-bar used in my invention.

In the said drawings like numbers of reference designate corresponding parts throughout.

Referring to the drawings, the main chain-link 7 is formed of a square frame having broad flat sides, the plane of the breadth thereof lying at right angles to the plane of said link. The links 8 are circular in form and are interlocked with the square link 7 and are arranged in pairs at each of two opposite sides of link 7.

The cross bar or rod 9 consists of a cylindrical body or stem, 10, having the circumferential grooves 11, formed one near each end. The heads or caps 12 are hollow globular bodies, made of sheet metal, and are formed over the ends of the stem 10, and have their marginal edges nested in the grooves 11, in order to retain the caps securely in position, as shown.

The section I show of my chain may be constructed by first interlocking three of the circular links 8 with the square or main link 7, then inserting the completed cross-bar 9 through the links 7 and to the outside of the links 8 so that the ends of the bar project equally at each side of the link 7, and then completing the construction by interlocking a fourth circular link 8 with the said link 7. By virtue of this construction the ends of the cross-bar 9 being too large to pass through the area lying between the outsides of the four circular links 8, the cross-bar will be locked and held in position with a circular link 8 passing one through each of the four interior corner angles of the square link 7. Again, my novel form of chain may be put together by first interlocking the four circular links 8 with the square links 7, and then inserting the incomplete cross-bar 9, having but one holding-cap thereon, as 12, and when said bar is in position placing the other holding-cap 12 upon the stem 10 of the cross-bar. This of course forms the same chain as that just described.

The cross-bar admits of much variation in the design, and may be of any suitable construction or form, and necessarily must be provided at the ends with the holding or locking parts as equivalents for the globular caps I show.

By the above-described constructions the chain may be made without solder. However, in case soldering should be preferred to rigidly secure together the set of links, it may be readily done by placing a drop or two of solder upon the cross-bar to bind the links thereto.

By joining together a series of the group of links above described a complete and flexible chain may be formed. I have, however, shown a portion or section of my improved chain as connected with two different kinds of ordinary forms of chain-links, as 13 and 14, respectively.

There may be various modifications made in the several parts of my invention without making a substantial departure from the spirit of the same as herein described and claimed. For instance, the forms of the links used may be readily changed. Oval or square shaped links may be substituted for the circular links shown.

Having thus described my invention, I claim as new and desire to secure by Letters Patent—

1. The combination of a link, two or more links entering said first link, and a cross-bar extending through said first link and provided with locking or holding pieces upon the ends.

2. The combination of a link, two or more links interlocking with said first link and having their planes approximately normal to the plane thereof, and a cross-bar provided with locking or holding ends, said bar passed through said first link transversely thereof and retained in position by means of said holding ends.

3. The portion or section of a chain consisting of a link, two links interlocking with said first link at each of two opposite ends thereof, and a cross-bar having enlargements at the ends thereof, said bar placed through said first link transversely thereof and lying to the outside of said interlocking links.

4. The chain composed of a series of interlocked sections or divisions consisting of the following parts, viz: a link, two or more links entering said first link, and a cross-bar set through said first link transversely thereto, said cross-bar provided with holding ends for retaining said bar in position.

5. The combination of a rectangular link, two or more links having curved frames and interlocking with said rectangular link, and a cross-bar provided with bulbous or enlarged ends, said bar lying through said rectangular link and engaging with said curved links, substantially as described.

6. The combinations of the square link having broad flat sides, the four circular links interlocked with said square link, and the cross-bar provided with the spheroidal ends and disposed through said square link and in engagement with the peripheries of said circular links, substantially as described.

7. The combination of the rectangular link 7, two or more of the circular links, 8, and the cross-bar 9, composed of the stem 10 and the caps 12, substantially as described.

8. The combination, with a link, of four links interlocked with the first link, as described, and a cross-bar provided with enlarged ends inserted between the four links, as described.

OSCAR M. DRAPER.

Witnesses:
JOSEPH A. MILLER,
J. A. MILLER, Jr.